US005786910A

United States Patent [19]
Walters et al.

[11] Patent Number: 5,786,910
[45] Date of Patent: Jul. 28, 1998

[54] PATTERN METALLIZED OPTICAL VARYING SECURITY DEVICES

[75] Inventors: Glenn J. Walters, Duxbury; John A. McCormick, Lakeville, both of Mass.

[73] Assignee: Advanced Deposition Technologies, Inc., Taunton, Mass.

[21] Appl. No.: 438,776

[22] Filed: May 11, 1995

[51] Int. Cl.⁶ .................................................. G03H 1/00
[52] U.S. Cl. .................. 359/2; 283/86; 235/380; 235/441; 235/451; 235/492; 340/825.34; 342/51; 428/916
[58] Field of Search .................. 359/1, 2, 3; 283/72, 283/83, 85, 86, 91, 93, 94; 428/916; 342/6, 51; 235/441, 451, 457, 492, 380; 340/825.34; 380/23

[56] References Cited

U.S. PATENT DOCUMENTS

| | | | |
|---|---|---|---|
| 4,184,700 | 1/1980 | Greenaway | 283/6 |
| 4,684,795 | 8/1987 | Colgate, Jr. | 235/457 |
| 4,717,615 | 1/1988 | Reinhart | 428/161 |
| 4,933,120 | 6/1990 | D'Amato et al. | |
| 4,941,687 | 7/1990 | Crane | |
| 5,068,008 | 11/1991 | Crane | |
| 5,083,850 | 1/1992 | Mallik et al. | |
| 5,085,514 | 2/1992 | Mallik et al. | |
| 5,116,548 | 5/1992 | Mallik et al. | |
| 5,128,779 | 7/1992 | Mallik | |
| 5,145,212 | 9/1992 | Mallik | |
| 5,486,022 | 1/1996 | Crane | 283/83 |
| 5,513,019 | 4/1996 | Cueli | 359/2 |
| 5,517,195 | 5/1996 | Narlow et al. | 342/51 |
| 5,519,516 | 5/1996 | Wreede | 359/3 |
| 5,581,257 | 12/1996 | Greene et al. | 342/51 |

*Primary Examiner*—Jon W. Henry
*Assistant Examiner*—Darren E. Schuberg
*Attorney, Agent, or Firm*—Wolf, Greenfield & Sacks, P.C.

[57] ABSTRACT

Security devices which are difficult to reproduce include a grid screen metallization pattern. The grid screen metallization pattern may be laid down over a hologram or diffraction grating formed as a surface relief pattern on a substrate, to form a visually identifiable, semi-transparent security device. Additionally, the metallization pattern may include resonant structures in which information about the security device is encoded. In some embodiments of these security devices, the metallization pattern is disposed in accurate registration with the underlying hologram or diffraction grating. These security devices are made by methods which include printing an oil pattern on the substrate. Areas on which oil is deposited do not receive metal during a metallization step. Since these methods do not use caustics, metallization patterns including features which would otherwise trap and hold caustics are possible.

20 Claims, 6 Drawing Sheets

PATTERN METALLIZED OPTICAL VARYING SECURITY DEVICES

FIELD OF THE INVENTION

The present invention generally relates to authenticating devices, and more particularly relates to holograms used as security and anti-counterfeiting components of personal identification cards, credit cards, product labels, documents, currency and the like.

BACKGROUND OF THE INVENTION

Holograms are commonly used as authenticating devices since the hologram, providing a three-dimensional image, is difficult to copy or reproduce. Holograms are records of an interference pattern formed by light at a recording location. Typically a photographic plate, placed at the recording location, is used to make and preserve an original holographic record. Commonly, the recorded interference pattern is that of a three dimensional image of a subject.

Many techniques are available for recording a hologram. In one technique, illustrated in FIGS. 5A–5C, a laser light source is used since it produces a beam of light 501 whose waves are coherent, i.e. whose peaks and valleys are in synchronous alignment. The beam 501 is split by a beam splitter 503 into an object light beam 505 and a reference light beam 507. The object light beam 505 is directed onto the subject recorded 509 and reflects off the surfaces of the subject 509 as an image beam 511 onto a photographic plate 513. The reference light beam 507 travels directly to the photographic plate 513 over a fixed path. Since the surfaces of the subject recorded 509 are at different depths relative to the photographic plate 513, different parts of the image beam 511 travel different distances. The waves of the image beam 511 both constructively and destructively interfere with the waves of the reference light beam 507 at the photographic plate 513 since the peaks and valleys of the light waves arrive at the photographic plate 513 in different alignment. The interference pattern formed by the constructive and destructive interference is recorded as a pattern of light and dark areas on the photographic plate 513, forming a laser-viewable master hologram H1.

It is desired to produce a hologram which is viewable without a laser reference beam. Therefore, the hologram H1 produced as described in connection with FIG. 5A forms a master for producing a secondary hologram H2, as now described in connection with FIG. 5B.

The secondary hologram H2 is formed by recording the interference pattern formed by illuminating the master hologram with an illuminating laser beam 514. The illuminating laser beam 514 is split by a beam splitter 517 into two light beams, one of which 516 is passed through the master hologram to form an image beam 519, which falls onto a photographic plate 521. The reference light beam 515 is directed onto the photographic plate 521, where the reference light beam 515 and the image light beam 519 form an interference pattern representative of a three dimensional image 523 of the original subject 509.

Finally, as shown in FIG. 5C, the secondary hologram H2 may be viewed using reflected ordinary light. The interference pattern representative of the three dimensional image 523 of the original subject 509 appears along a secondary axis 525, while an ordinary reflection of the light source appears along a primary reflection axis 529.

Reproducing a large volume of holograms photographically in high volumes is not economically viable. Therefore, commercial holograms are most commonly produced by embossing or casting a relief pattern on a thin film. The relief pattern is often representative of the interference fringes of an original hologram, which may have been photographically recorded. The relief pattern is simply a pattern of ridges on a surface of the thin film. The spacing between the ridges and the width of the ridges corresponds to the spacing and width of the interference fringe pattern in the original hologram. However, the relief pattern itself is not readily seen because the reflectivity, scattering, or transmissivity is insufficient to produce a visible reconstructed light pattern. While some non-metallic materials are deposited on holographically embossed structures to amplify the holographic relief pattern (so-called transparent commercial holograms), most commercial holograms use a thin metallic layer to amplify the holographic relief pattern by reflection. Such metallically amplified holograms are generally opaque. Typically, the metal used for holograms in security devices is aluminum applied using a vacuum evaporative process.

One important difference arises between the original photographic hologram and the commercial hologram embodied in a relief structure. The photographic hologram includes information representing both amplitude, i.e. brightness, and phase, i.e. interference pattern spacing. The three dimensional images of commercial holograms have a substantially uniform brightness. Thus, even when amplified by metal deposition, they may be difficult to see.

Although not considered true holograms, various patterned diffraction gratings may also be produced by similar methods. While a hologram may be considered to be a special type of diffraction grating, non-hologram diffraction gratings are often sufficiently difficult to reproduce to be appropriate for use in some security applications.

Various credit and identification cards, as well as some product labels, employ commercial holograms or diffraction gratings to deter counterfeiting by providing a visual indication of authenticity. Some product labels and currency depend on fine plastic threads with metallic print to increase the difficulty of counterfeiting, also by providing a visual indication of authenticity. Both holograms and fine metallic print are used together in these and other applications, because the visual indication of authenticity is both difficult to reproduce by conventional means and easily verified by direct observation. For further security, the hologram or metal printing security device may be secured to the document such that the security device will be destroyed or otherwise exhibit evidence of tampering upon any attempt to remove the security device. This will be discussed in further detail below.

An example of the application of this conventional technology to the production of secure documents is now described in connection with FIGS. 1–4 from Mallik, U.S. Pat. No. 5,128,779.

As shown in FIG. 1, an identification card 101 may include both textual information printed thereon 103, and an identification image 105, e.g. your picture, applied thereto. An overlaminate 107, having a semi-transparent hologram 109 embossed thereon, is affixed to the surface of identification card 101. The semi-transparent hologram 109 may be produced a number of ways. For example, in Mallik, a microscopic chemically etched, non-continuous, metallic dot pattern is used to produce amplified holograms having a light transmissivity of about 50% (FIG. 2).

Security holograms are normally attached to a document by one of two methods which are selected to provide tamper evidence if one attempts to alter the protected document.

One attachment method is simply to use a pressure sensitive adhesive 301 having a high sheer strength. The overlaminate 107 carrying hologram 109 is tightly pressed together with document 101 at room temperature to form a bond. After manufacture of the commercial hologram 303, the adhesive 301 is generally covered by a protective release paper layer 305 for storage and shipping, which is removed just before application to a document 101. If the sheer strength of the adhesive 301 is sufficiently high, then the metal 307 of the hologram 109 is stripped away from the overlaminate 107 if one attempts to remove the overlaminate 107 from the document 101.

A more popular method of attachment, particularly in high volume operations such as found in applying holograms to credit cards, is a hot stamping technique. In hot stamping, the hologram is carried on a flexible carrier sheet 309 with a wax-like release coating 311. The release coating 311 is chosen to melt at a much lower temperature than the adhesive 301. After the overlaminate 107 itself is fully pressed against the document 101 at an elevated temperature, the overlaminate 107 is pulled from the carrier 309 and adheres to the document 101. In the hot stamping operation, a release paper layer 305 is not used. Hot stamping also relies on a high sheer strength of the adhesive 301 to visually alter the hologram 109 during tampering, by removing metal 307 from the hologram 109 embossed on the overlaminate 107.

After attachment by either method, the structure appears as shown in FIG. 4.

The fine thread of metallic print found in some currencies and other security devices and the metallic dot screen used in semi-transparent holograms conventionally is obtained by a demetallization process. The pattern is formed by first metallizing a roll of clear plastic material, usually polyethylene teraphthalate (PET), over its entire surface. Unwanted metal is removed by an etching process—either by selectively applying a caustic solution to metal to be removed or by protecting the metal to be retained with a lacquer, and then applying a caustic solution to the entire metallic surface.

Mallik uses dot screens which are non-continuous patterns of dots, i.e. dots which are not connected with each other, applied over a surface. The security devices disclosed in Mallik employ a uniform dot screen to amplify a commercial hologram, while permitting a high degree of light transmissivity through the commercial hologram. Mallik uses a relatively thick metallic layer, for compatibility with his method for making the dot screen. The metallic layer may be 200–600 Å thick.

Mallik further discloses several methods of fabricating a semi-transparent, dot screen hologram. The methods of forming the dot screen as a non-continuous reflective layer include: 1) lacquer demetallization with dilute sodium hydroxide of a relatively thick (i.e. 200–600 Å) aluminum layer formed by vacuum evaporation, in which a continuous metallized substrate is printed where metal is to be retained with a lacquer impervious to the sodium hydroxide; 2) direct or lacquerless demetallization with dilute sodium hydroxide; 3) printing a liquid form of aluminum; and 4) evaporation of aluminum through a solid mask. These methods may also be used to produce fine metallic text, such as used on security threads in some currencies.

Mallik's preferred method of forming the non-continuous reflective areas of the semi-transparent or non-continuous reflective hologram is lacquer demetallization. This method produces satisfactory semi-transparent areas comprised of minute, relatively thick, isolated reflective islands, i.e. a dot screen. However, when semi-transparent areas formed of minute clear apertures within a continuous metallic grid, i.e. a grid screen, are attempted using Mallik's preferred method, lacquer demetallization, the results are generally unsatisfactory.

Continuous metallic grids which have been attempted using a demetallization process are subject to erosion of the metallic grid due to the difficulty in removing or neutralizing the caustic used to etch the metallic layer. The caustic becomes trapped in wells formed by the patterned lacquer and etched apertures in the metallic layer and cannot easily be neutralized or washed out. As a result, over time the metallic layer is completely destroyed by over-erosion. On the other hand, in a dot screen, demetallized patterns of isolated metallic islands inherently include channels in the patterned lacquer to facilitate the washing away or neutralizing of the caustic. Over-erosion of metallic grids is particularly pronounced when the layer of metal being etched is very thin. Controlling the demetallization of thin metallic layers is particularly difficult, because the metal is removed from thin areas at a relatively high rate, compared to thicker areas. Furthermore, when etchant is applied to the metal layer, it continues to react with the metal layer until either the metal neutralizes the etchant applied, or the etchant is washed off. Thin layers may continue to erode, even after washing, because washing may not completely remove the etchant applied.

Another problem of current holographic security devices is that improvements in technology have made them somewhat easier to copy. Although the present generation of devices is still difficult to copy, added protection at a minimal cost increment is still sought.

Finally, current security devices generally require visual inspection, possibly with the aid of special equipment to verify authenticity. Quick, automatic security scanners currently require additional features to be incorporated into identification cards, product labels, and the like. Such features may include bar codes, microwave resonant structures, and various other electrically or optically detectable features which may be remotely sensed. Adding these features to identification cards, product labels and the like complicates the production of the objects or documents to which the security devices have been attached.

SUMMARY OF THE INVENTION

The above problems are solved by various aspects of the methods and devices in accordance with the present invention.

One aspect of the present invention is a semi-transparent commercial hologram amplified by a continuous grid screen of either a metal or a high refractive index material. In accordance with this aspect of the present invention, the hologram is randomly repeated over the surface of a substrate, and the grid screen is applied over the entire surface of the substrate. In some embodiments incorporating this aspect of the invention, the grid screen is fully continuous over a surface area covered which is less than the full surface of the substrate.

Another aspect of the present invention is a semi-transparent commercial hologram, in which the underlying hologram image pattern forms a fixed, repeating pattern on the substrate. In accordance with this aspect of the invention, the fixed repeat is made to accommodate dividing the web into devices, with one hologram image on each device. As in the first aspect of the invention, an overall application of a continuous grid screen renders visible each hologram image.

Yet another aspect of the invention is a semi-transparent commercial hologram, in which the hologram is randomly repeated over the surface of a substrate, and the grid screen is applied to regions of the substrate in a pattern which repeats in a fixed manner to accommodate separating devices from the substrate with one amplified hologram image on each device.

Yet another aspect of the present invention is a semi-transparent commercial hologram, in which a selective metallization pattern registered with the underlying hologram image amplifies the underlying hologram image. In accordance with this aspect of the invention, both the underlying hologram and the selective metallization pattern applied have substantially the same fixed repeat, which have been precisely registered to each other. For example, the selective metallization pattern may be a grid screen or dot screen half-tone of the brightness values of the original hologram from which the commercial hologram was produced. By registering the metallization pattern with the underlying hologram, an enhanced semi-transparent commercial hologram results.

Methods to produce embodiments of the invention including aspects noted above, use pattern metallized printing which creates visual identification security products. In accordance with another aspect of the invention, direct pattern metallization yields several new security devices, previously unachievable.

Pattern metallized printing (PMP) generates screened security products employing any desired combination of dot screen and grid screen structures. Grid screens and other structures including holes in and surrounded by a metal layer, which are currently not consistently produced with demetallization, become practical with pattern metallized printing. For example, current methods cannot consistently produce a metal layer of text including the letter "O". These advantages are particularly true in applications requiring a very thin metal layer. PMP generates grid screens and other structures having holes in metal layers having thicknesses in a range of at least 10-1,000 Å. PMP is suitable for producing metal layers and layers of high refractive index materials, such as $Al_2O_3$, ZnS, $SiO_x$.

A pattern metallized security device according to the invention may include a substrate, one surface of which includes a relief pattern; and a metallic grid screen disposed thereon. The grid screen may cover the entire surface of the substrate or may cover a substantial region, such as a lane in which the surface relief pattern has been made. According to a variation, the grid screen may be continuous over the region, whether the entire surface or a more limited region. According to another variation, the relief pattern may be a random repeat pattern along one direction of the substrate, for example in a machine direction lane. Yet other variations include having the metallic grid screen overlay a predetermined, fixed area of the security device, including a portion of the random repeat pattern, mentioned previously; disposing the metallic pattern on the substrate and arranged to form a series resonant circuit, when the device is used; forming the series resonant circuit includes an inductor element and a capacitor element in series connection; and, disposing the metallic pattern on the substrate and arranged to form a plurality of high frequency resonant structures.

Another pattern metallized security device according to the present invention may include a substrate, one surface of which includes a relief pattern at a predetermined location thereon; and a metallic film disposed thereon in registration with the relief pattern. The metallic film may be a grid screen. In a variation of this device, the metal layer may be a half-tone image corresponding to the underlying relief pattern, registered thereto.

Yet another pattern metallized security device according to the invention may include a substrate, on one surface of which is disposed a surface relief pattern which may be a diffraction pattern or a commercial hologram; and a metallic grid screen having a coverage substantially in a range of 5-80% and a resolution of greater than 50 grid lines per inch disposed thereon. In a variation, the device may include metal character printing of characters having a height less than 0.020 inch high. Yet another variation includes a second diffraction pattern embossed on a second surface of the substrate; and a second metallic grid deposited on the second diffraction pattern. In variations on the diffraction pattern, the diffraction pattern could further include a pattern having a random repeat, and, wherein the metallic grid exhibits a regular repeat; and the diffraction pattern could further include a pattern having a regular repeat at an interval, and, wherein the metallic grid exhibits a pattern which repeats at the interval of the diffraction pattern. The metallic grid could further include regions of a repeating pattern of metallic dots. The metallic regions may be arranged to form a resonant structure having a resonance frequency indicative of a code. The metallic grid may form a region substantially opaque to electromagnetic radiation at a predetermined frequency and the metallic dots form a window which is substantially transparent to electromagnetic radiation at the predetermined frequency. In another variation, the metallic pattern may be made to have one or more resonant frequencies indicative of a code disposed on a second surface of the substrate, under the window. Finally, there may be a second code structure disposed on the second surface of the substrate, under the electromagnetically opaque region, whereby the second code structure is detectable only upon destruction of the electromagnetically opaque region.

BRIEF DESCRIPTION OF THE DRAWINGS

In the figures, in which like reference numerals denote like structures.

DETAILED DESCRIPTION

The present invention will be better understood upon reading the following detailed description, in connection with the drawings.

Figure 1:
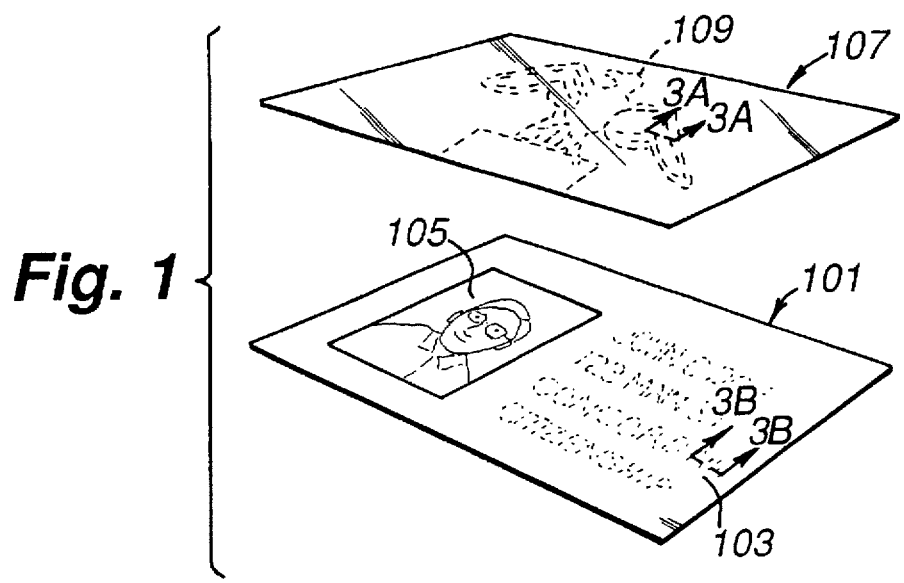
FIG. 1 is an exploded view of a document incorporating a holographic security device.
Figure 2:
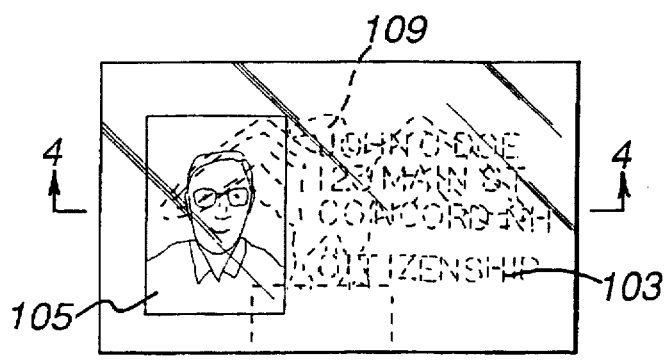
FIG. 2 is a view of the face of the document of FIG. 1.
Figure 3A:
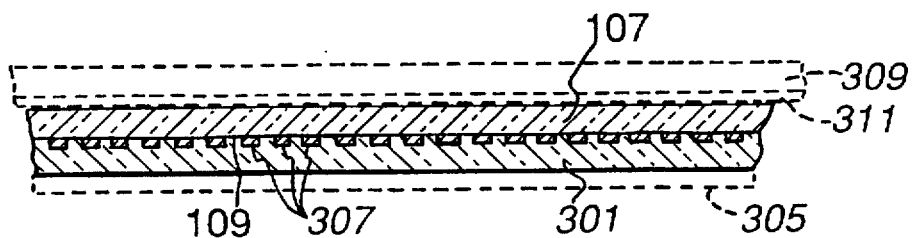
FIGS. 3A and 3B are cross-sectional views of the overlaminate and underlying document of FIG. 1, respectfully.
Figure 3B:
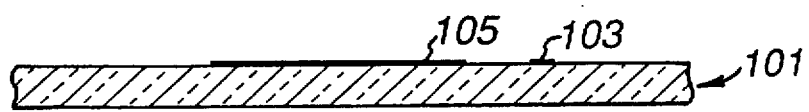
Figure 4:
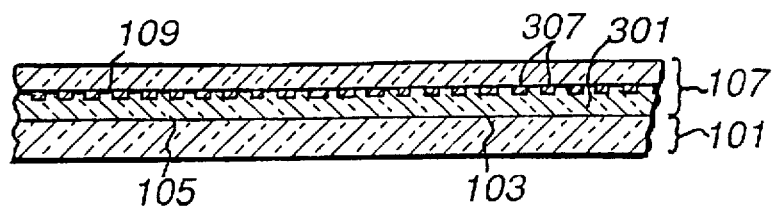
FIG. 4 is a cross-sectional view of the assembled document of FIG. 2.
Figure 5A:
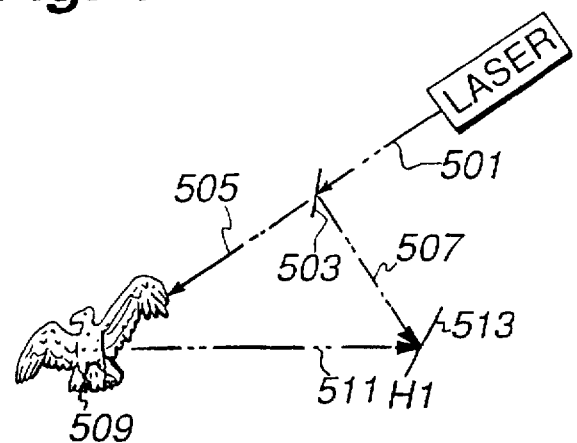
FIGS. 5A, 5B and 5C are schematic illustrations of general holographic principles.
Figure 5B:
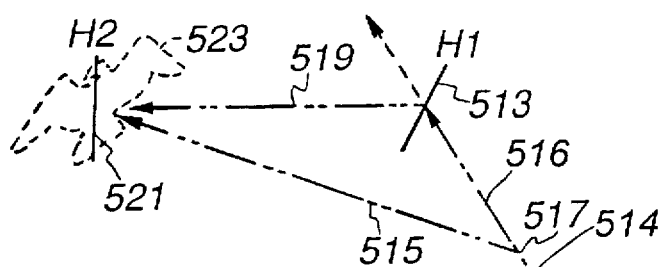
Figure 5C:
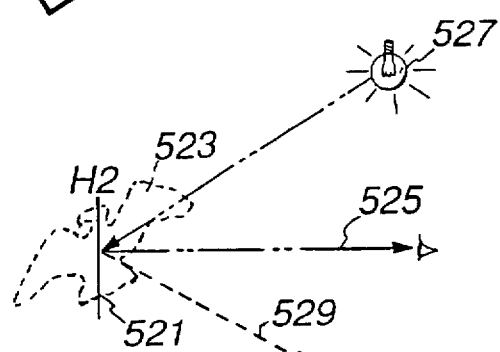
Figure 6A:
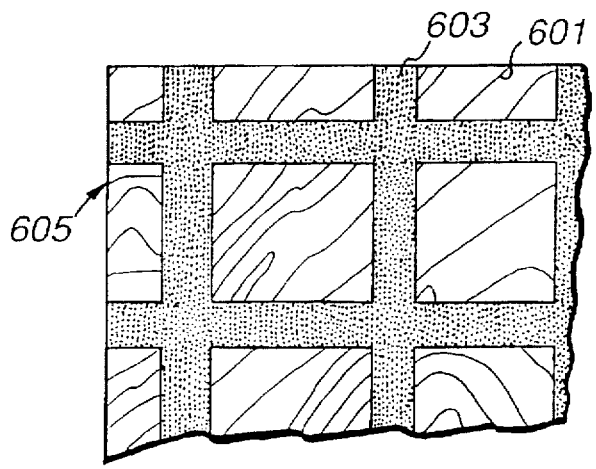
FIGS. 6A and 6B are a plan view and a cross-section of a detail of a security device according to one aspect of the present invention.
Figure 6B:
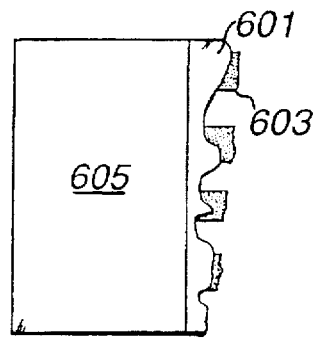

A structure prepared in accordance with one aspect of the present invention is generally illustrated in FIGS. 6A and 6B. The structure includes a commercial hologram, formed as a surface relief pattern 601 and a metallization layer 603 deposited thereon. Although the illustrated structure is described as made by first preparing a commercial hologram 601 on a substrate 605 and then applying a metal layer 603, it could also be made by first metallizing a substrate 605 and then forming on the surface a commercial hologram 601. The structures which are produced by either technique, however, both conform to the general description given.

An underlying surface relief hologram 601 is first prepared using conventional techniques. A surface relief pattern which represents the interference pattern recorded in an original hologram is provided on a substrate 605, for example, by means of the hot press method or the continuous casting method. Both of these methods are well known to those skilled in this art. The surface of the hologram 601 is then pattern metallized printed (PMPed), to form a continuous grid-like pattern referred to hereinafter as a grid screen 603. Although reference is herein made to pattern metallized printing of a metallic layer, it should be understood by those skilled in this art that the described technique is also applicable to the production on a substrate of a high index of refraction layer. Such high index of refraction materials are also suitable for amplifying commercial holograms, e.g. commercial hologram 601. In the grid screen 603, the spacing between grid lines should be narrow enough not to disturb an average viewer. A spacing of approximately 0.017 inch or less has proven satisfactory. The grid line widths should be selected so as to provide a light transmissivity of about 70% to permit easy viewing and partial transparency. Satisfactory transmissivities in the vicinity of 70% have been achieved using a metal coverage of about 25%. However, for special purposes requiring a stronger or weaker semi-transparent holographic effect, metal coverage substantially in the range of 5–80% can be used. The semi-transparent holographic effect can also be varied by varying the metal layer thickness from 10–1,000 Å. The optical density of metal layers may be adjusted by adjusting the thickness of the layer, as well as by adjusting the metal coverage.

Security devices employing the characteristics described above have several advantages not realized by conventional security devices. The new device is harder to copy than older devices because it is difficult to satisfactorily produce using the above discussed conventional demetallization techniques. Instead, the present security device is preferably made by direct metal vapor pattern deposition in a vacuum chamber.

A method of making these devices using a vacuum chamber is described below. When made according to this preferred method, no caustic is used; thereby eliminating the concern about caustic residue. Finally, by using a grid screen, which is conductive and has variable electromagnetic filtering characteristics, security devices may be made to bear electromagnetic signatures. A conductive continuous grid structure having given grid spacing, conductivity and line thickness will reflect substantially all the energy below a predetermined frequency. The grid should be about 1/16 the wavelength of the highest frequency to be reflected. As will be understood by those skilled in this art, this is merely a rule of thumb intended to achieve a substantial degree of reflectivity at the predetermined frequency. The rule and the frequency may be varied to suit particular purposes. Thus, by varying the grid spacing, conductivity and line thickness, different grids may be applied to a device to pass selected spectra, which constitute the electromagnetic signatures.

As illustrated in FIG. 7A–7E, the metallization pattern can mix a variety of known structures, including high frequency resonators and antennas, and the like. The regions referred to below as semi-transparent holograms or semi-transparent diffraction gratings have a micro-structure substantially as discussed above in connection with FIGS. 6A and 6B.

The structures which may be incorporated in the metallization are not limited to those having clear channels through which to wash etchant. Instead, the structures include holes through the metal wherein etchant is trapped, if made by conventional demetallization. The front and back overlaminates of FIGS. 7A–7E are each prepared as single sheets 701, intended to be folded in half along a fold line 703, about the secured document (picture 705 and text 707 shown in phantom).

Figure 7A:
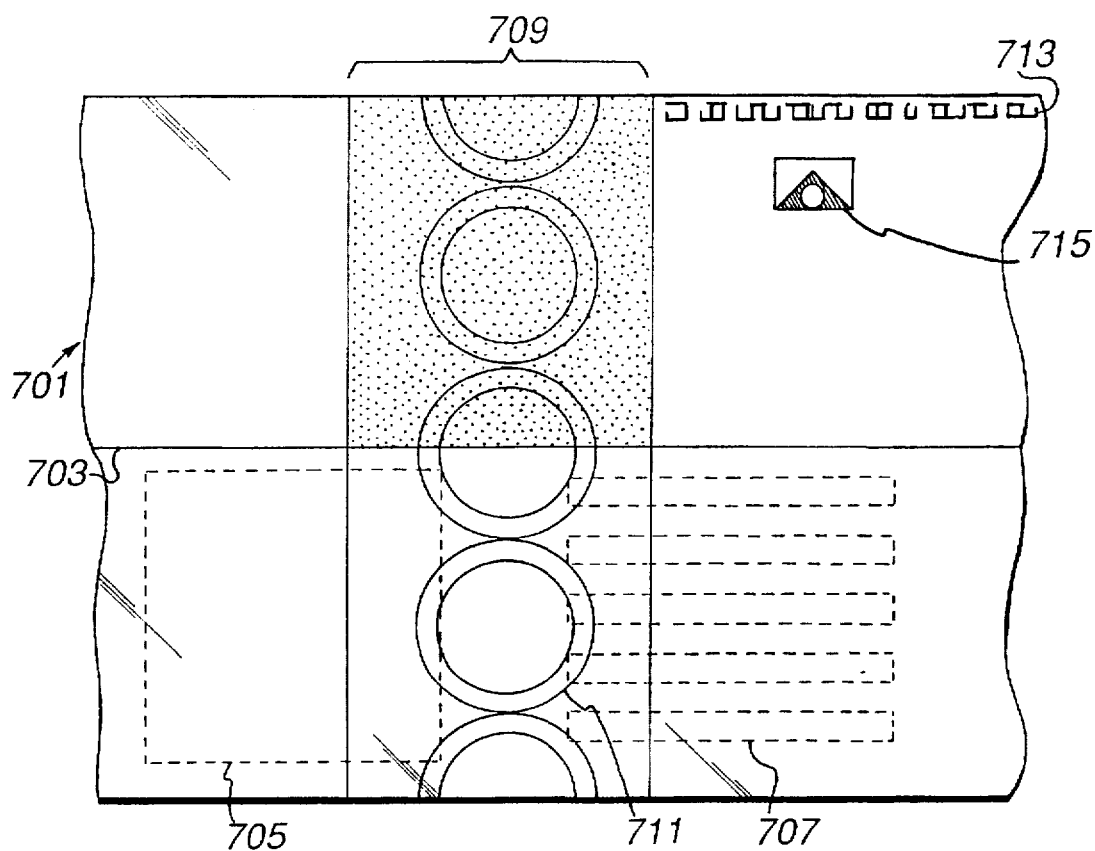
FIGS. 7A-7E are plan views of overlaminate blanks prepared in accordance with various aspects of the present invention.
Figure 7B:
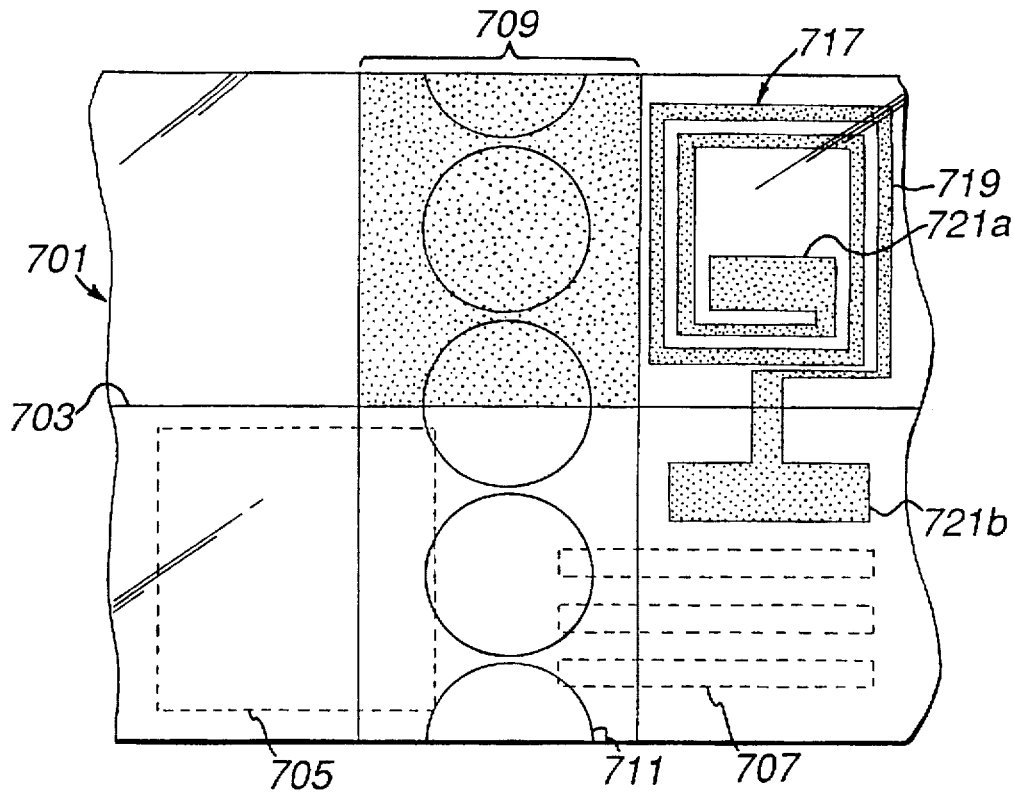
Figure 7C:
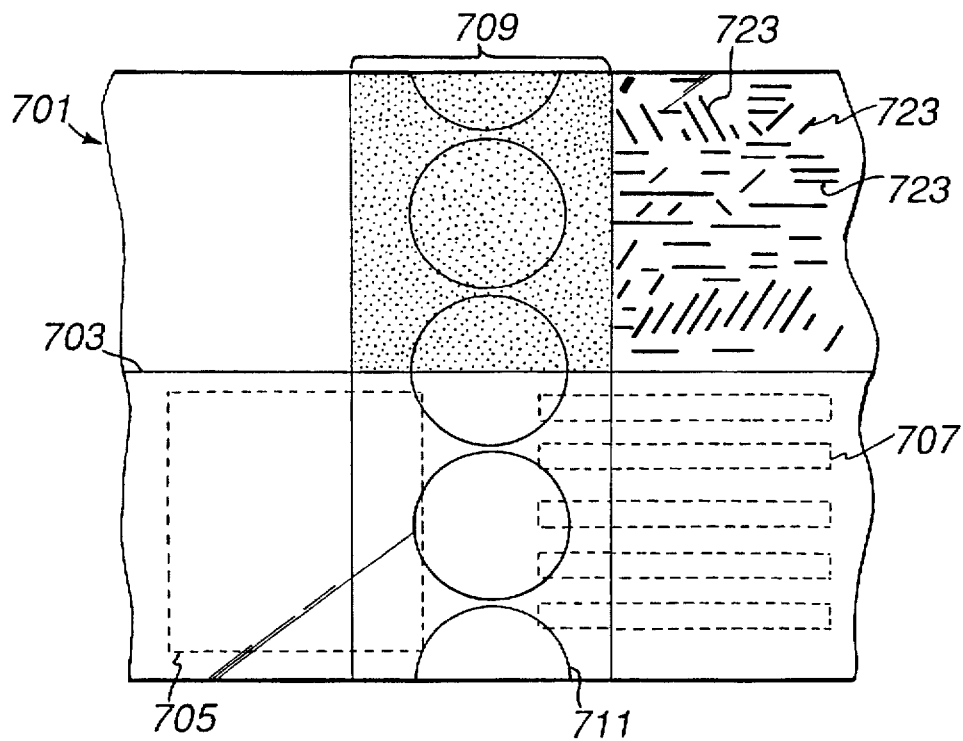
Figure 8:
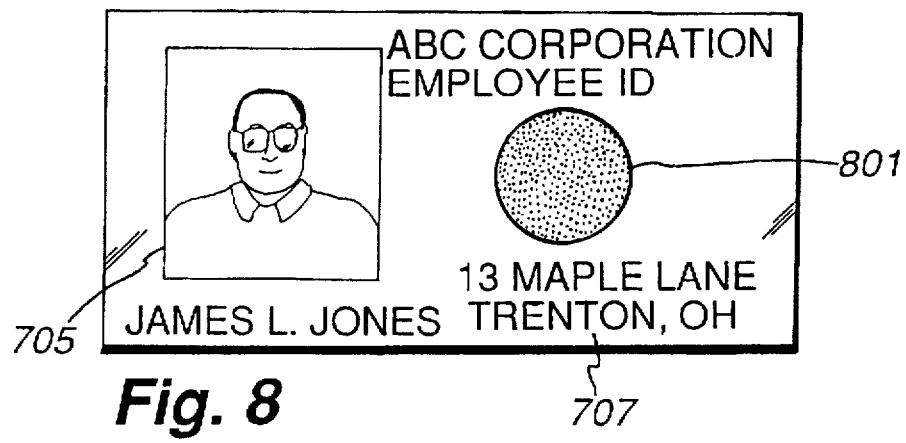
FIG. 8 is a secured document prepared in accordance with another aspect of the present invention.
Figure 9:
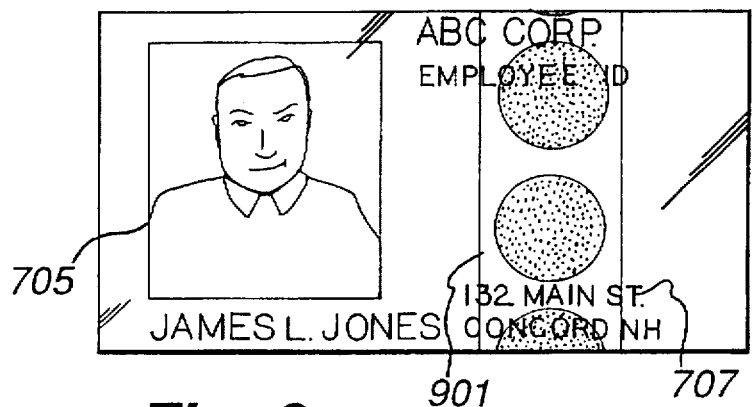
FIG. 9 is a secured document prepared in accordance with another aspect of the present invention.

As illustrated in FIGS. 8 and 9, the structure described above in connection with FIGS. 6A, 6B and 7A–7C may be used to secure a document, such as an identification card. FIGS. 8 and 9 generally show documents secured using overlaminates carrying semi-transparent holograms. FIG. 9 shows the simplest system, where the hologram 901 is randomly repeated a plurality of times in at least one direction across the document. The entire randomly repeated hologram 901 is metallized with a continuous grid screen, as described above in connection with FIGS. 6A and 6B. A more sophisticated system is illustrated in FIG. 8, in which the hologram 801 is repeated a fixed number of times, e.g. one time, on each document, and a continuous grid screen is again metallized over the entire region in which the hologram might appear. Alternatively, the appearance of the document shown in FIG. 8 might be achieved by a yet more sophisticated approach, in which the grid screen is selectively applied only to the actual hologram within the region, and precisely registered thereto. Other variations on overlaminate systems are shown and described now, in connection with FIGS. 7A–7C.

In the example of FIG. 7A, the overlaminate sheet has embossed thereon an area 709 having a surface relief pattern 711 comprising an overall holographic repeating pattern or diffraction grating, known to those skilled in the art as a random repeat. Each identification card thus receives one or more full or random portions of the repeating pattern 711. The surface relief pattern 711 of the overlaminate is enhanced by a continuous grid screen, as described above in connection with FIGS. 6A and 6B. As a result, both the surface relief pattern 711 and the underlying printed 707 and pictorial 705 information on the identification card are observable. Areas of the overlaminate which cover underlying identification information 705 and 707 may be clear or may be metallized with a continuous grid screen to form a semi-transparent hologram. Areas of the overlaminate which do not cover any underlying identification information may be made opaque with a more complete metallization, metallized text 713 or metallized graphics 715.

As shown in the example of FIG. 7B, the device of FIG. 7A may be enhanced by forming a high frequency, electromagnetically resonant structure 717 in the metallization layer. A series-resonant inductor 719 and capacitor 721a and 721b (LC) circuit, as shown, may operate in the 8–10 MHz range. The particular, precise frequency of resonance could serve as a code indicative of authenticity. In the illustrated structure, when the overlaminate is folded and applied to a document to be secured, the plates 721a and 721b act as a capacitor, with the secured document between them forming the dielectric. A coil 719 completes the resonant circuit. As in FIG. 7A, each identification card receives one or more full or random portions of the repeating pattern 711. The surface relief hologram of the overlaminate is enhanced by a continuous grid screen, as described above in connection with FIGS. 6A and 6B. Again, both the hologram and the underlying printed and pictorial information on the identification card are observable. Areas of the overlaminate which cover underlying identification information may be clear or may be metallized with a continuous grid screen to form a semi-transparent hologram. Areas of the overlaminate which do not cover any underlying identification information, for example those portions of the overlaminate corresponding to the back of the identification card, may be made opaque with a more complete metallization, metallized text or metallized graphics.

The structure of FIG. 7C is again similar to that of FIGS. 7A and 7B. However, microwave frequency resonant structures 723, which operate in the GHz frequency ranges are formed in the metallization, rather than the high frequency LC resonant circuit 717. The microwave frequency resonant structures 723 are simply metallized areas of shapes computed to exhibit desired resonances. In this type of structure, the particular combination of resonant frequencies serves as a code indicative of authenticity.

Each of FIGS. 7A-7C show the random repeating hologram 711 as appearing in a machine-direction lane 709 of the overlaminate material 701. That is, each overlaminate blank 701 is cut from a web processed by moving through the embossing and metallization machines in the machine-direction. An advantage of this arrangement is that overlaminate blanks of an arbitrary size in the machine direction could be cut from such a web. Prior to metallization, the size of the blank in the machine direction is not fixed. When the grid screen is applied over the entire holographic lane, the size of the blank in the machine direction remains unfixed. Once a grid screen is applied to areas which have a fixed repeat, the size of the blank would become fixed, however, simirepeat commenate stock already carrying random repeat commercial holograms could be metallized in different sizes at different times, without having to replace the stock. The random repeat occurs at such a high spatial frequency as to ensure that a wide variety of overlaminate sizes are accommodated by the web. Indeed, the repeat frequency of overlaminate blanks along the web in the machine direction is determined by the metallization pattern, particularly in such embodiments as shown in FIGS. 7B and 7C. Those embodiments have features intended to show up exactly once on each blank.

In a different arrangement of the overlaminate blank, each blank may be assumed to be of a fixed size, and each blank may include features intended to show up a fixed, predetermined number of times.

As mentioned above and illustrated in FIG. 8, the structure described above in connection with FIGS. 6A, 6B, 7D and 7E may also be used to secure a document, such as an identification card. In this case, each individual overlaminate has a similar hologram, which appears in a predetermined location, only a predetermined number of times on the overlaminate blank.

Figure 7D:
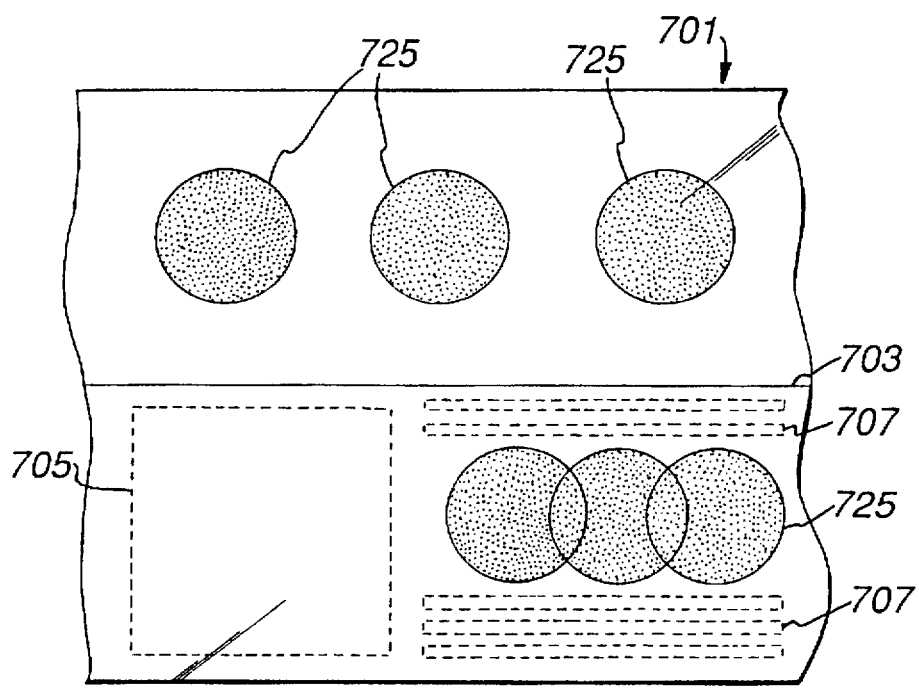

In FIG. 7D, an embodiment is shown in which a fixed number of holograms 725 appear at predetermined locations on the web. The metallization is applied selectively to and registered with these fixed hologram locations 725. The holograms 725 may be opaque or semi-transparent, as required. Areas where the overlaminate is required to be transparent may be left free of metallization. Unlike in the embodiments of FIGS. 7A-7C, the clear areas need not run in machine-direction lanes, because the metallization is registered with the underlying holograms 725.

Figure 7E:
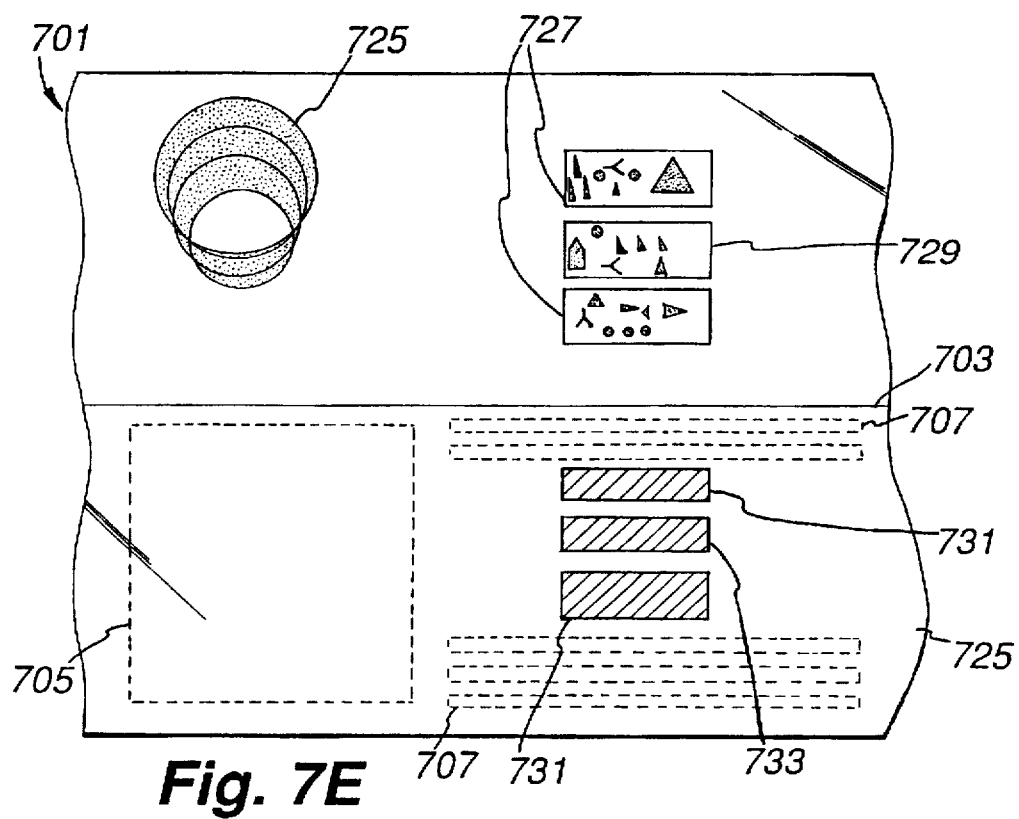

The embodiment of FIG. 7E illustrates yet another refinement available by use of the present invention. The metallization pattern registered to the holograms 725 may be, for example, a half-tone image of the intensity information of the original hologram from which the surface relief hologram was produced. Thus, an enhanced contrast hologram may be produced. Such an enhanced contrast hologram would be extremely difficult for a counterfeiter to reproduce, because of the difficulty in achieving registration of the surface relief pattern with the metallization. Likewise, microscopic structures 727 and 729 which are essentially undetectable to the viewer, but which may be observed with special equipment, could be registered with the hologram so as to make counterfeiting more difficult. For example, information could be encoded in the form of electromagnetically resonant structures 727 and 729. By causing the structures to be registered with selected portions of the metallization, they may be placed so that when the overlaminate is applied to a document, some (e.g. 727) are located behind electromagnetically opaque portions of the grid screen 731 while others (e.g. 729) are located behind electromagnetically transparent portions 733 of the grid screen. When a document secured with such a system is tampered with, the formerly undetectable resonant structures 727 located behind the opaque portions 731 of the grid screen may become detectable because continuity of the formerly opaque portions 731 of the grid screen may become broken.

Pattern metallized printing processes have been developed using equipment sold in the United States by Galileo Vacuum Systems, Connecticut, and Leybold Technologies, Inc., Connecticut. These systems are custom built to operate within and in connection with various makes of vacuum metal deposition equipment. Generally speaking, these systems operate by depositing a substance, such as an oil, onto the surface of a web which subsequently undergoes vacuum metal deposition. The substance is selected to cause the metal to fail to adhere to selected portions of the web, thus permitting metallic patterns to be deposited on the web with a resolution limited only by the substance deposition process.

Extremely fine resolution metallization patterns are possible using this technique. The actual resolution achieved depends on several factors. The ultimate limit to resolution of this system depends upon the quantity and placement of the substance on the web. These are subject to design parameters which are generally worked out by the system manufacturer and customer.

In one machine for practicing the above-described method, the substance used is a diffusion pump oil having release characteristics similar to silicone oil. Other similar materials may also be used, provided they prevent the adhesion of vaporized metal to the surface on which they have been deposited. The entire process may be enclosed within a vacuum deposition chamber.

The process and machine described thus far are suitable for producing articles of the general types shown in FIGS. 7A-7C. The process and machine is also capable of producing articles having substantially similar characteristics to the holographic overlaminates illustrated, such as articles having extremely fine metallic lettering, fine metallic diffraction gratings, and the like.

As mentioned above, the described process may include techniques to produce metallization patterns closely registered with underlying features of the substrate, such as illustrated in FIGS. 7D and 7E.

Techniques for registering a pattern formed by a deposited substance, and hence the resulting metallization, with an underlying hologram are similar to those well-known in the printing arts. They generally involve separately controlling the speed of various rollers or web accumulation devices over which a substrate web passes and which produce the pattern, to subtly alter the phase between the pattern and the underlying surface relief pattern present on the web. Extremely precise registration, similar to that achievable in printing arts, is thus achievable.

The present invention has now been described in connection with several particular embodiments thereof. The embodiments described are provided for illustrative purposes, only. Numerous variations and modifications of these embodiments will now be evident to those skilled in this art, which are contemplated to be within the scope of this invention. Thus, the scope of the invention is not intended to be limited by the foregoing description, but rather the scope of the invention is intended to include all subject matter encompassed by the appended claims and the equivalents thereto.

What is claimed is:

1. A pattern metallized security device, comprising:
   a substrate, one surface of which includes a surface relief pattern; and
   a metallic grid screen disposed thereon, the grid screen composed of a plurality of intersecting grid lines having a density and a line width selected to visually amplify the surface relief pattern and to be partially transparent to an observer, the line width being narrow enough not to disturb the observer,
   the metallic grid screen defining one region substantially opaque to electromagnetic radiation at a predetermined frequency, and a second region substantially transparent to electromagnetic radiation at the predetermined frequency, and a metallic pattern indicative of a code disposed in a position to lie under the second region.

2. The device of claim 1, wherein the grid screen is continuous over the area on which the grid screen is disposed.

3. The device of claim 1, the relief pattern further comprising:
   a random repeat pattern along one direction of the substrate.

4. The device of claim 3, wherein the metallic grid screen overlays a predetermined, fixed area of the security device, including a portion of the random repeat pattern.

5. The device of claim 1, further comprising:
   a metallic pattern disposed on the substrate, the metallic pattern arranged to form a series resonant circuit, when the device is used.

6. The device of claim 5, wherein the series resonant circuit includes an inductor element and a capacitor element in series connection.

7. The device of claim 1, further comprising:
   a metallic pattern disposed on the substrate, the metallic pattern arranged to form a plurality of high frequency resonant structures.

8. The device of claim 1, wherein the metallic grid screen has a coverage substantially in a range of 5–80% and a resolution of greater than 50 grid lines per inch.

9. The device of claim 1, further comprising:
   metal character printing of characters having a height less than 0.020 inch high.

10. The device of claim 1, further comprising:
    a second surface relief pattern embossed on a second surface of the substrate; and
    a second metallic grid deposited on the second surface relief pattern.

11. The device of claim 1, wherein the surface relief pattern further comprises:
    a pattern having a random repeat; and
    wherein the metallic grid exhibits a regular repeat.

12. The device of claim 1, wherein the surface relief pattern further comprises;
    a pattern having a regular repeat at an interval; and
    wherein the metallic grid exhibits a pattern which repeats at the interval of the surface relief pattern.

13. The device of claim 1, further comprising:
    a region of a repeating pattern of metal other than a grid screen.

14. A pattern metallized security device, comprising:
    a substrate, one surface of which includes a relief pattern at a predetermined location thereon; and
    a patterned metallic film disposed thereon in registration with the relief pattern whereby features defined in the relief pattern are precisely aligned with corresponding features defined in the patterned metallic film, the patterned metallic film pattern having a density and a line width selected to visually amplify the surface relief pattern and to be partially transparent to an observer, the line width being narrow enough not to disturb the observer,
    the patterned metallic film defining one region substantially opaque to electromagnetic radiation at a predetermined frequency, and a second region substantially transparent to electromagnetic radiation at the predetermined frequency, and a metallic pattern indicative of a code is disposed in a position to lie under the second region.

15. A pattern metallized security device, comprising:
    a substrate, one surface of which includes a relief pattern at a predetermined location thereon; and
    a patterned metallic film disposed thereon in registration with the relief pattern, the patterned metallic film further comprising a grid screen, the grid screen composed of a plurality of intersecting grid lines having a density and a line width selected to visually amplify the surface relief pattern and to be partially transparent to an observer, the line width being narrow enough not to disturb the observers,
    the patterned metallic film defining one region substantially opaque to electromagnetic radiation at a predetermined frequency, and a second region substantially transparent to electromagnetic radiation at the predetermined frequency, and a metallic pattern indicative of a code is disposed in a position to lie under the second region.

16. The device of claim 15, the grid screen further comprising:
    a half-tone image corresponding to the underlying surface relief pattern, registered thereto.

17. A pattern metallized security device, comprising:
    a substrate, on one surface of which is disposed a commercial hologram: and a metallic grid screen having a coverage substantially in a range of 5–80% and a resolution of greater than 50 grid lines per inch disposed thereon; and a region of a repeating pattern of metal other than a grid screen;

wherein the repeating pattern of metal forming the region is arranged to form a resonant structure having a resonance frequency indicative of a code.

18. The device of claim 17, wherein the metallic grid forms a region substantially opaque to electromagnetic radiation at a predetermined frequency and wherein the region of a repeating pattern of metal other than a grid screen defines a window which is substantially transparent to electromagnetic radiation at the predetermined frequency.

19. A pattern metallized security device, comprising:

a substrate, on one surface of which is disposed a commercial hologram; and a metallic grid screen having a coverage substantially in a range of 5–80% and a resolution of greater than 50 grid lines per inch disposed thereon;

wherein the metallic grid forms a region substantially opaque to electromagnetic radiation at a predetermined frequency, wherein the metallic grid defines a window which is substantially transparent to electromagnetic radiation at the predetermined frequency, and wherein a metallic pattern indicative of a code is disposed in a position to lie under the window, when the device is applied to a document.

20. The device of claim 19, wherein a second code structure is disposed on the second surface of the substrate, under the electromagnetically opaque region, whereby the second code structure is detectable only upon destruction of the electromagnetically opaque region.

* * * * *